US005824934A

United States Patent [19]

Tsurumi et al.

[11] Patent Number: 5,824,934

[45] Date of Patent: Oct. 20, 1998

[54] KARAOKE SYSTEM INCLUDING HOST APPARATUS THAT DOWNLOADS INFORMATION FILE BASED ON LIST OF NECESSARY INFORMATION FILES

[75] Inventors: Kanehisa Tsurumi; Youji Semba, both of Hamamatsu; Yuichi Murai, Tokyo, all of Japan

[73] Assignee: Yamaha Corporation, Hamamatsu, Japan

[21] Appl. No.: 740,447

[22] Filed: Oct. 29, 1996

[30] Foreign Application Priority Data

Nov. 6, 1995 [JP] Japan .................................... 7-287607

[51] Int. Cl.[6] ............................. G09B 5/00; G09B 15/04; G10H 1/26

[52] U.S. Cl. ........................ 84/609; 84/477 R; 434/307 A

[58] Field of Search ..................... 84/601, 602, 609–614, 84/634–638, 645, 477 R, 478; 434/307 A

[56] References Cited

U.S. PATENT DOCUMENTS

| | | | |
|---|---|---|---|
| 5,252,775 | 10/1993 | Urano | 84/645 |
| 5,464,946 | 11/1995 | Lewis | 84/609 |
| 5,489,103 | 2/1996 | Okamoto | 434/307 A X |
| 5,496,178 | 3/1996 | Back | 434/307 A |
| 5,532,923 | 7/1996 | Sone | 84/634 X |
| 5,589,947 | 12/1996 | Sato et al. | 84/645 X |
| 5,631,433 | 5/1997 | Iida et al. | 84/610 |

*Primary Examiner*—Stanley J. Witkowski
*Attorney, Agent, or Firm*—Pillsbury Madison & Sutro LLP

[57] ABSTRACT

A host apparatus stores all of music-piece files and information files, and also stores lists information files (information file lists) required for a plurality of areas where communication karaoke apparatuses are located. When music-piece files are downloaded to a communication karaoke apparatus, information files are simultaneously downloaded. Information files required for the area are determined based on the area where the communication karaoke apparatus is located, and only the necessary information files are downloaded together with the music-piece files. As a result, the operation efficiency and the communication efficiency can be enhanced. At this time, a list of information files stored in the communication karaoke apparatus is requested, and only difference information files are downloaded so that the efficiencies can be further enhanced.

8 Claims, 4 Drawing Sheets

KARAOKE SYSTEM INCLUDING HOST APPARATUS THAT DOWNLOADS INFORMATION FILE BASED ON LIST OF NECESSARY INFORMATION FILES

BACKGROUND OF THE INVENTION

1. Field of the Invention

The invention relates to a host apparatus for a communication karaoke apparatus in which information files containing CM (commercials) and the like which are displayed during an intermission between karaoke performances can be downloaded for each area, and their versions can be updated, and also to a method of editing a download file.

2. Related Art

In a karaoke parlor such as a karaoke box, during an intermission between karaoke music pieces, various kinds of information including concert information, advertisements for various goods and stores such as bars, and newly released music information are displayed to a customer. Information files storing the information are downloaded from a host apparatus together with music-piece data, and then stored on a storage apparatus such as a hard disk.

Some information files such as a CM which is to be displayed only in specific areas are necessary only for some areas and unnecessary for other areas. However, a conventional host apparatus downloads a superset containing all music-piece files and all information files to any communication karaoke apparatus, so that unnecessary information files are downloaded so as to waste time. As a result, the operation efficiency of the host apparatus is disadvantageously deteriorated, and a waste communication cost is introduced.

SUMMARY OF THE INVENTION

It is an object of the invention to provide a host apparatus for a communication karaoke apparatus in which necessary information file lists for respective areas are prepared, and information files are downloaded to each communication karaoke apparatus based on the list of the information files, thereby eliminating the waste communication. It is also an object of the invention to provide a method of editing a download file.

According to the present invention, there is provided a host apparatus for a communication karaoke apparatus which downloads a music-piece file for performing a karaoke performance by driving musical sound synthesizing means and image synthesizing means, and an information file for displaying various kinds of information by driving the musical sound synthesizing means and the image synthesizing means, to a plurality of communication karaoke apparatuses, wherein the host apparatus comprises: information file list storing means for storing a list of necessary information files for each of communication karaoke apparatuses or for each of areas where communication karaoke apparatuses are located; means for, when a music-piece file is downloaded to a communication karaoke apparatus, extracting an information file which is to be downloaded, based on a list of information files corresponding to the communication karaoke apparatus; and means for downloading the extracted information file together with the music-piece file.

According to the present invention, there is provided a method of editing a download file in a method of downloading a music-piece file for performing a karaoke performance by driving musical sound synthesizing means and image synthesizing means, and an information file for displaying various kinds of information during an intermission of the karaoke performance by driving the musical sound synthesizing means and the image synthesizing means, to a plurality of communication karaoke apparatuses, wherein lists of necessary information files are stored respectively for a plurality of areas, and when a music-piece file is downloaded to a communication karaoke apparatus, an information file which is to be downloaded is extracted based on a list of information files corresponding to the communication karaoke apparatus, and the extracted information file is downloaded together with the music-piece file.

In the invention, the host apparatus downloads music-piece files for performing karaoke performances, and information files for displaying information such as CM between performances of karaoke music pieces, to communication karaoke apparatuses. The music-piece files for performing karaoke performances are necessary for all of the communication karaoke apparatuses. However, some information files are necessary only for selected areas, such as a CM which is to be displayed only in selected areas (i.e., a local CM).

The host apparatus stores lists of information files which are necessary for respective communication karaoke apparatuses or for respective areas where the communication karaoke apparatuses are located. When download is performed, information files to be downloaded are extracted based on an information file list corresponding to the communication karaoke apparatus to which the files are downloaded, or corresponding to the area where the communication karaoke apparatus is located. In the extraction, the information files shown in the information file list may be directly extracted as information files to be downloaded. Alternatively, a list of information files which are now stored may be received from the communication karaoke apparatus to which information files are downloaded, and the list may be compared with the necessary information file list so that difference information files are extracted as information files to be downloaded. The thus extracted information files to be downloaded are downloaded together with the music-piece files. Thus, the download of waste information files can be eliminated so that the operation efficiency of the host apparatus is enhanced and communication time is saved.

DETAILED DESCRIPTION OF THE PREFERRED EMBODIMENTS

Figure 1:
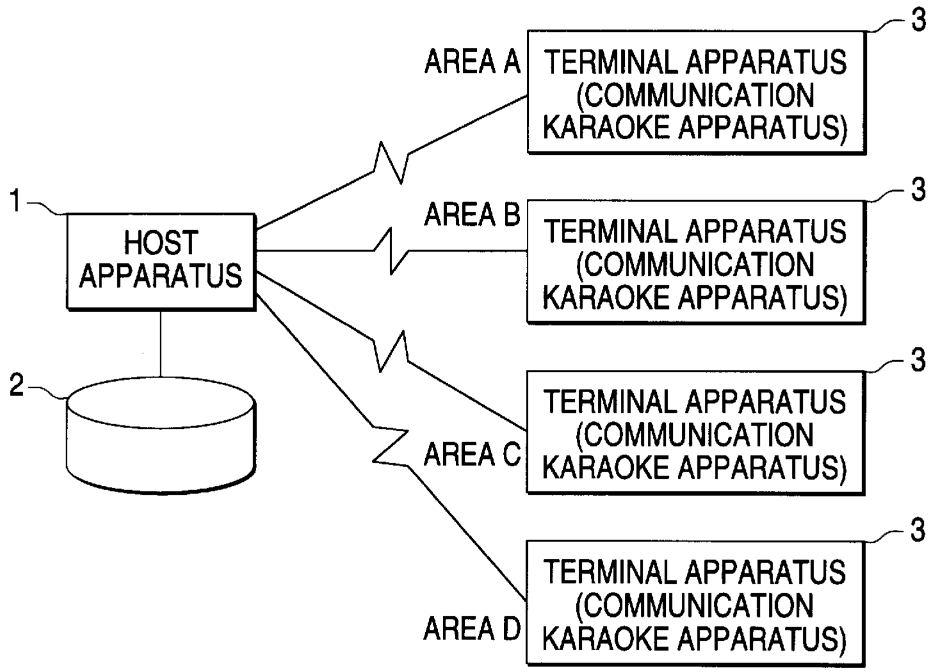
FIG. 1 is a diagram showing the configuration of a communication karaoke system which is an embodiment of the invention.

FIG. 1 is a diagram, showing the configuration of a communication karaoke system which is an embodiment of the invention. A communication karaoke apparatus is configured in such a manner that a host apparatus 1 is connected to a plurality of terminal apparatuses, i.e., communication karaoke apparatuses 3, via telephone lines. In the figure, four communication karaoke apparatuses 3 are connected to the host apparatus 1. The four communication karaoke apparatuses 3 are located in areas A, B, C, and D, respectively. The telephone lines may be public telephone lines, and the connection of the line may be established as required.

A large-capacity storage apparatus 2 is connected to the host apparatus 1. The large-capacity storage apparatus 2 stores music-piece files and information files which are to be downloaded to the communication karaoke apparatuses 3. A music-piece file is a data file for performing a karaoke performance including a header, a musical sound track, a word display track, a voice track, and the like. An information file has substantially the same construction as that of the music-piece file (or configured by a header, a BGM track, a character display track, an announce track, and the like). An information file is a data file for displaying newly released music information, concert information, CM for goods and stores, and the like.

The large-capacity storage apparatus 2 also stores an information file list for each of the plurality of areas (see FIG. 4(A)). The information file list is a list of information files which are to be downloaded to a communication karaoke apparatus in each area. The contents of each list are updated as the occasion arises. When a newly released music file is to be downloaded, the host apparatus 1 receives the information file list of a communication karaoke apparatus (the list of information files stored in the communication karaoke apparatus at that time: see FIG. 3(A)), and compares the received list with the information file list of the host apparatus (see FIG. 4(A)). Then, only information files which are not included in the list from the communication karaoke apparatus are downloaded together with the newly released music file. At this time, the updated information file list is also downloaded (see FIG. 4(B)).

Figure 2:
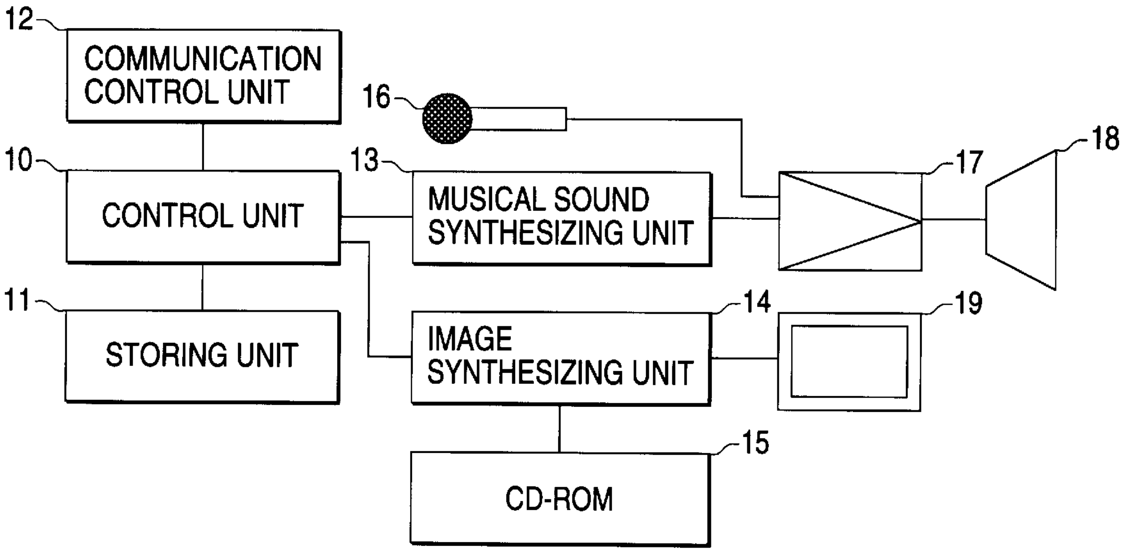
FIG. 2 is a block diagram of a communication karaoke apparatus which is a terminal apparatus of the communication karaoke system.

FIG. 2 is a block diagram of a communication karaoke apparatus which is a terminal apparatus in the communication an karaoke system. The communication karaoke apparatus performs a karaoke performance on the basis of a music-piece file received from the host apparatus, and reproduces data of information files so as to display CM and newly released music information between performances of karaoke music pieces. A control unit 10 for controlling the operation of the whole apparatus is constituted by a micro-computer. A communication control unit 12, a storing unit 11, a musical sound synthesizing unit 13, and an image synthesizing unit 14 are connected to the control unit 10. The communication control unit 12 is connected to the host apparatus 1 via a public telephone line, and controls communication with the host apparatus 1 such as the download of a file set consisting of music-piece files, information files, etc. The storing unit 11 stores downloaded music-piece files and information files. The musical sound synthesizing unit 13 synthesizes the accompanying sound based on data of a musical sound file (a musical sound track and a voice track), and reproduces the voice of a back chorus and the like. The musical sound synthesizing unit 13 reproduces and synthesizes an announce voice and BGM based on data of the information files. The musical sound synthesizing unit is connected to a sound system 17. Signals of synthesized musical sound and reproduced voice are input into the sound system 17. A microphone 16 for singing a song is connected to the sound system 17. The voice of a singer is input through the microphone 16 for singing a song. The sound system 17 applies effects such as reverberation to these signals and then amplifies the signals, and then outputs them to a loudspeaker 18. The image synthesizing unit 14 produces an image which is to be displayed on a monitor 19, based on data of the music-piece file. A CD-ROM player 15 is connected to the image synthesizing unit 14. A background image stored in the CD-ROM is selected based on genre data and the like contained in the music-piece file. The music-piece file contains word display data, and a character pattern of word telop is synthesized based on the data. An image to be displayed on the monitor 19 is generated by synthesizing the background image and the character pattern of word telop. Similarly to the music-piece file, the information file contains data for designating a background image, and character data for displaying CM and newly released music information. On the basis of these data, the image synthesizing unit 14 generates an information screen which is to be displayed on the monitor 19. The image synthesizing unit 14 stores simple graphic patterns (graphic primitive data) such as a circle, a triangle, and the like in addition to character patterns. The image synthesizing unit 14 can generate a screen in which these simple graphics are combined by designating the display of the graphics based on the data of an information file (a character display track).

Figure 3:
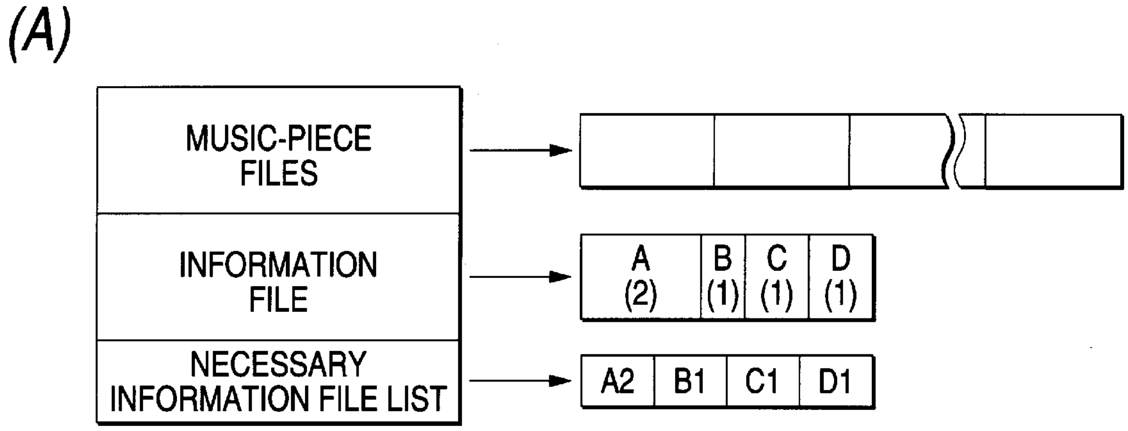
FIGS. 3(A) and 3(B) are diagrams showing the configuration of a storing section of the communication karaoke apparatus.
Figure 3:
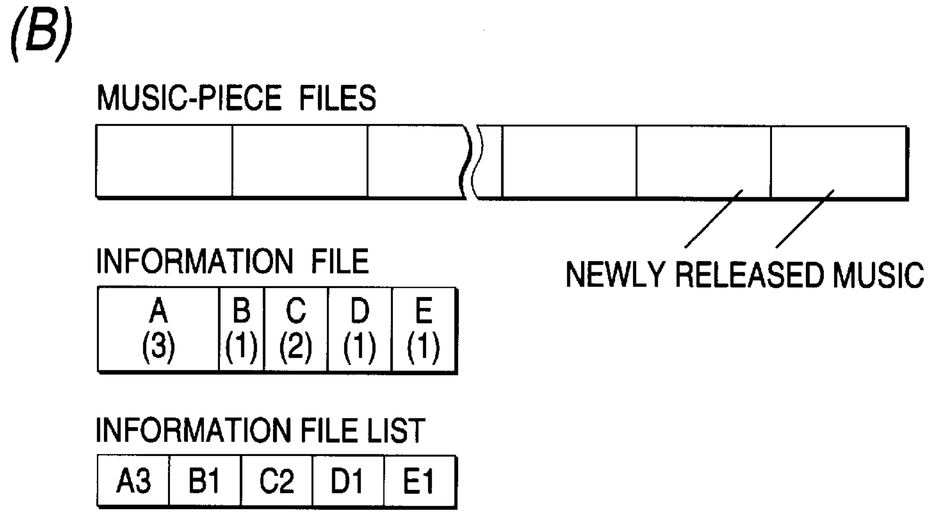
Figure 4:
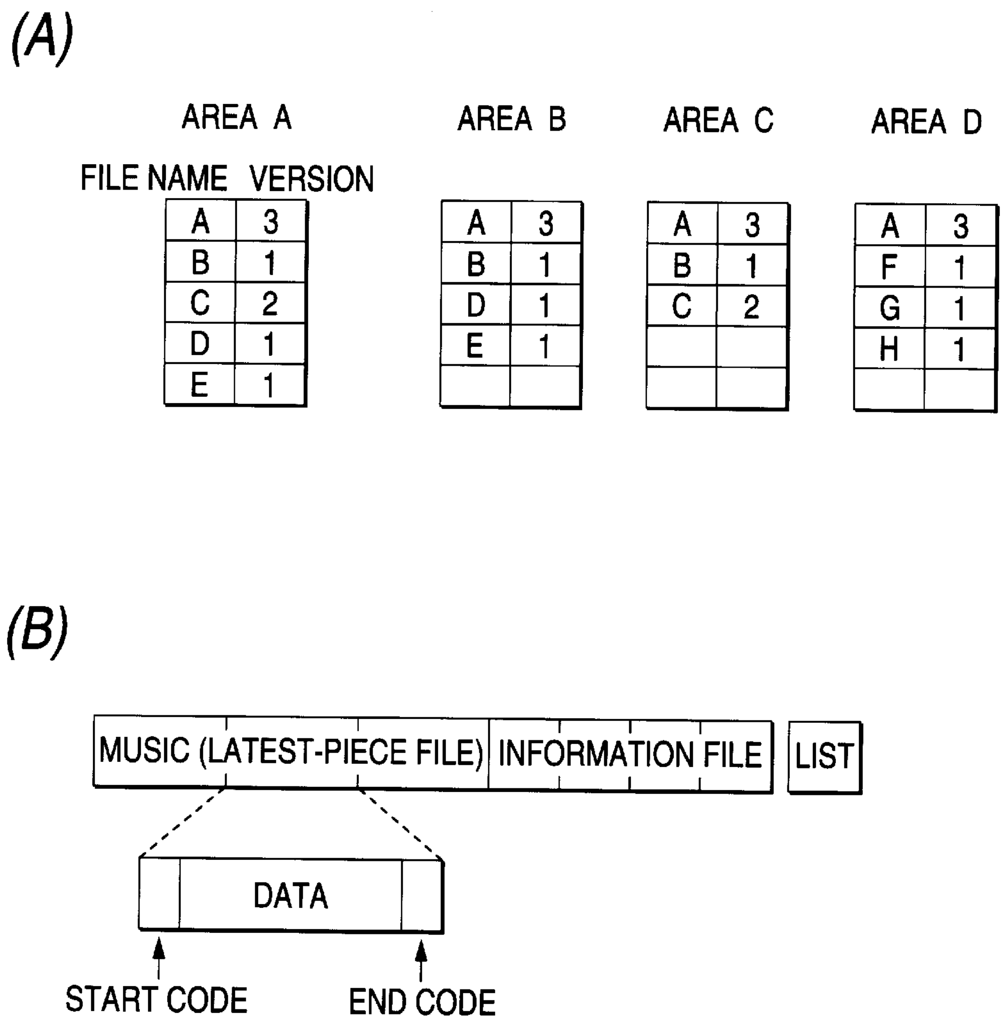
FIGS. 4(A) and 4(B) are diagrams showing the configuration of an information file list stored in a host apparatus of the communication karaoke system and that of a file set to be downloaded.

FIG. 3 is a diagram showing the configuration of the storing section 11 of the communication karaoke apparatus. FIG. 4 is a diagram showing the configuration of an information file list for each area stored in the host apparatus and that of a download data.

In FIG. 3, in the storing section 11, storing areas for music-piece files, information files, and an information file list are set. The music-piece file storing area stores music-piece files of several thousand music pieces. Music-piece files downloaded from the host apparatus 1 are added to this area. Each music-piece file is identified by a serial number. The information file storing area stores information files downloaded from the host apparatus 1. Unnecessary information files among information files which are already stored are deleted. The information files which are stored in the storing area are sequentially displayed during an intermission between karaoke performances (between performances of music pieces). After a karaoke performance, the communication karaoke apparatus 3 displays the information files in the above-mentioned order as far as time permits, and, when the next karaoke performance is to be started, immediately terminates the display of the information files. As for the information file of which the display is terminated in the middle of the information because of the start of the karaoke performance, the information file is displayed from the start thereof during the next intermission between music pieces.

The information file list is downloaded from the host apparatus 1 as described above. The list shows information files which should be stored in the communication karaoke apparatus 3 at that time. In the example shown in FIG. 3(A), in accordance with the contents of information file lists A2, B1, C1, and D1, an information file A (version 2), an information file B (version 1), an information file C (version 1), and an information file D (version 1) are stored.

In FIG. 4(A), the host apparatus 1 stores an information file list for each of the areas A to D. The information file list is subjected to maintenance as the occasion arises. As for the version of each information file, the number of the latest version stored in the host apparatus 1 is stored. When newly released music data (music-piece data) are to be downloaded to the communication karaoke apparatus 3, the host apparatus 1 first requires a transmission of an information file list from the communication karaoke apparatus 3. The transmitted information file list is a list of information files which are stored in the communication karaoke apparatus 3 at that time. The information file list is compared with the information file list for the area stored in the host apparatus 1. Information files which are not stored in the communication karaoke apparatus 3, and those which are stored in the communication karaoke apparatus 3 and of which the versions are updated are selected. The selected information files are edited and downloaded together with the newly released music data. In addition, the information file list stored in the host apparatus 1 is downloaded. A file set to be downloaded is shown in FIG. 4(B). The file set consists of one or plural newly released music files, selected information files, and an information file list which is edited for each area. The download is usually performed at a timing of about once a wee) so that one file set consists of newly released music files of about ten music pieces, and several information files. The entire file set occupies about 2 to 3 MB. A newly released music file consists of a start code, data, and an end code.

It is assumed that the communication karaoke apparatus shown in FIG. 3 is located in the area A. The file set of FIG. 4(B) which is edited based on the information file list of FIG. 4(A) contains the information file. A (version 3), the information file C (version 2), the information file E (version 1). FIG. 3(B) shows a condition of the storing section 11 in which, in the case where the communication karaoke apparatus is located in the area A, the condition shown in FIG. 3(A) has been subjected to maintenance by downloading the file set of FIG. 4(B). When the information file A (version 3), the information file. C (version 2), and the information file E (version 1) are downloaded, the versions of the information file A and the information file C are updated by overwriting because the old versions of the files are already stored. Since the information file E is a new information file, the file is written into a new area. Although not shown in this example, in the case where an information file which is not contained in the newly downloaded information file list is stored in the information file storing area, the information file is deleted.

Newly released music files stored in the host apparatus 1 are common to all of the communication karaoke apparatuses. However, some newly released music files can be performed by only part of communication karaoke apparatuses. When a file set containing such a newly released music file is downloaded to a communication karaoke apparatus which cannot perform the newly released music file, only a start code and an end code of the newly released music file which can be performed by only part of apparatuses are edited by the host apparatus, and then the file is transmitted. Therefore, the data of the file is not sent so that the amount of communication can be reduced.

Figure 5:
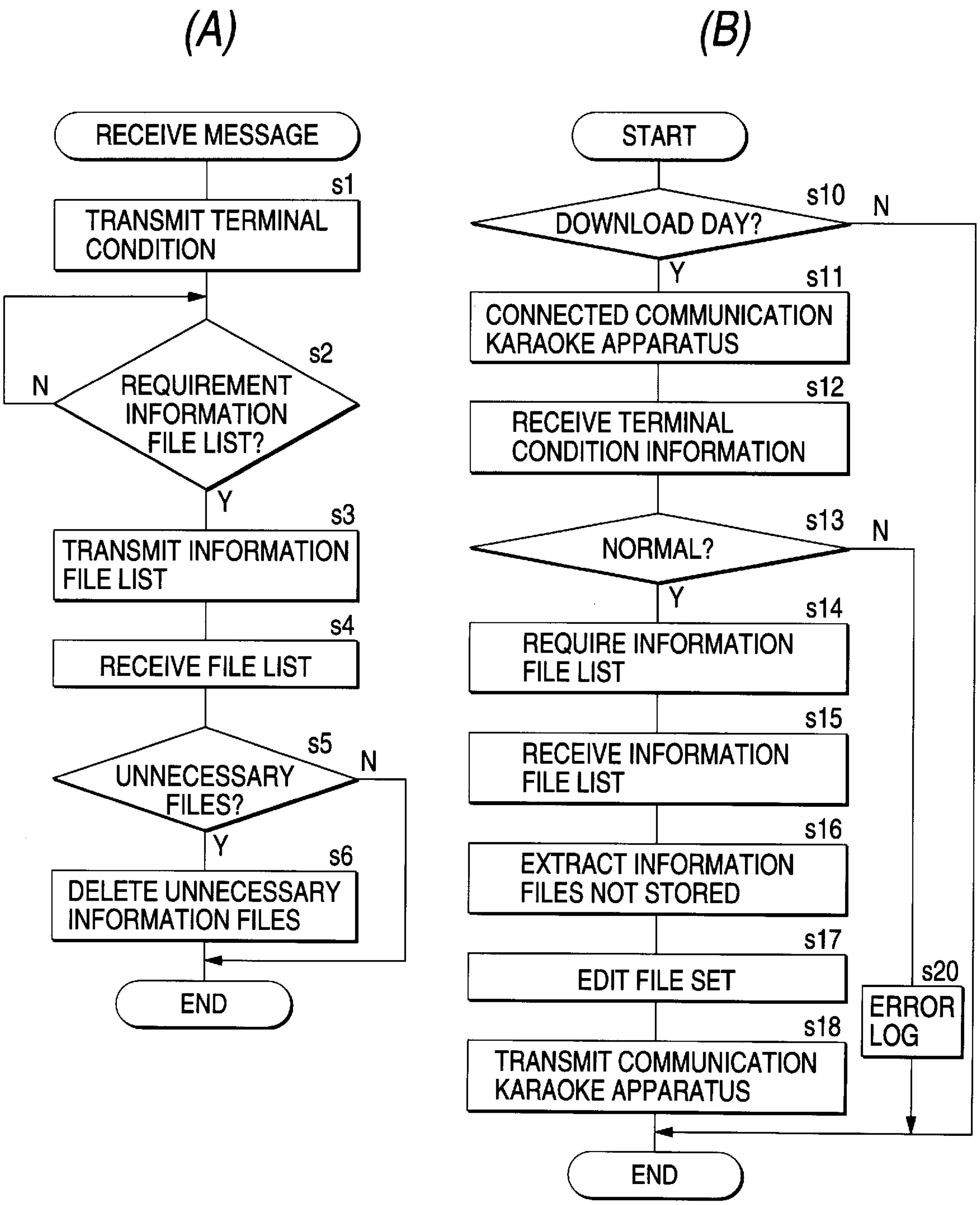
FIGS. 5(A) and 5(B) are flowcharts showing communication processing if operations of the communication karaoke apparatus and the host apparatus.

FIG. 5(A) is a flowchart illustrating a communication processing operation for the communication karaoke apparatus. FIG. 5(B) is a flowchart illustrating a download operation from the host apparatus to the communication karaoke apparatus.

In FIG. 5(A), when the communication karaoke apparatus 3 receives a telegraphic message requiring the start of download from the host apparatus 1, the operation starts. First, the terminal condition of the communication karaoke apparatus is transmitted (s1). The terminal condition is the information indicating whether the communication karaoke apparatus can receive the download of a file set from the host apparatus 1 or not. After the transmission of the terminal information, the apparatus waits until a transmission requirement of an information file list is sent (s2). When the transmission requirement of the information file list is received, the information file list stored in the storing section 11 is transmitted (s3). Information indicating in which area the communication karaoke apparatus 3 is located can be registered in the host apparatus 1. Alternatively, the information may be transmitted from the communication karaoke apparatus 3 to the host apparatus 1 together with the terminal condition or the information file list.

The host apparatus 1 edits the file set based on the contents of the information file list, and then transmits the edited file set to the communication karaoke apparatus (see s16 to s18 in FIG. 5(B)). The communication karaoke apparatus 3 receives the file set (s4), and stores it into predetermined storing areas. A newly released music file is additionally written into the music-piece file storing area. As for information files, new files are additionally written into a blank area. In the case of a new version of a file of the same name, the file is overwritten in the storing area of the old version. Next, the information file storing area is searched for unnecessary files (s5). Unnecessary files are information files which are previously stored in the information file storing area and not included in the newly transmitted information file list. That is, the information files are necessary until now, but they are unnecessary at this time. If there are such unnecessary information files, they are deleted (s6) so that the storing area is saved.

In FIG. 5(B), the host apparatus performs the operation on every download day. The download day is set to be once a week and in a time period during which communication karaoke apparatuses are not busy, for example, in the day time on Monday. On the download day (s10), a public telephone line is connected to a communication karaoke apparatus (s11). When the line is connected to the communication karaoke apparatus, terminal condition information is received from the communication karaoke apparatus (s12). If the information indicates that the communication karaoke apparatus does not normally operate, an error processing is performed (s20), and the communication is then terminated.

If the communication karaoke apparatus normally operates (s13), the host apparatus requires the information file list stored in the communication karaoke apparatus to be transmitted (s14). Then, the information file list which is transmitted from the communication karaoke apparatus in response to the requirement is received (s15). The information file list is compared with the information file list which is stored in the host apparatus and for the area where the communication karaoke apparatus is located, so that information files to be transmitted, i.e., information files which are not stored in the communication karaoke apparatus, and information files of which the versions are updated, are extracted (s16). The extracted information files, newly released music files, and a new information file list are collectively edited as a file set for download (s17). The file set is transmitted to the communication karaoke apparatus 3, and the download operation is terminated. The host apparatus 3 conducts the operation on each of the communication karaoke apparatuses.

As described above, the host apparatus 1 receives an information file list from the communication karaoke apparatus 3, and difference information files (information files which are not yet downloaded and those of which the versions are updated) are extracted. Only the extracted information files are downloaded. This cooperates with the provision of an information file list for designating information files required for each area, so as to further reduce the amount of data of information files to be transmitted.

The communication karaoke apparatus 3 can delete unnecessary information files by downloading an information file list from the host apparatus 1, so that the information file storing area is saved.

The information file list also contains information for the versions of information files. In the case where an information file having the same name is already downloaded to the communication karaoke apparatus and a new version of the file is registered in the host apparatus 1, therefore, the information file of the new version is automatically downloaded to the communication karaoke apparatus.

Even in the case where a newly released music file is not downloaded, the host apparatus may be connected to a communication karaoke apparatus in order to perform the maintenance on only information files.

Other than the method in which the download is performed when a predetermined day arrives, another method may be employed in which the download is immediately performed when a requirement is transmitted from a terminal apparatus (a communication karaoke apparatus), or when a new music-piece file is edited.

As described above, according to the invention, a list of information files for each communication karaoke apparatus or for each area is stored. When the download is performed, information files to be downloaded are extracted based on a communication karaoke apparatus to which the download is performed or an area where the communication karaoke apparatus is located. Only the extracted information files are downloaded. Therefore, the number of files to be downloaded is decreased, and the operation efficiency of the host apparatus can be enhanced. In addition, it is possible to contribute to a reduction in the communication time.

What is claimed is:

1. A karaoke system that includes a host apparatus, said karaoke system comprising:

a plurality of communication karaoke apparatuses to which said host apparatus downloads a music-piece file and an information file, the music-piece file being used for performing a karaoke performance by driving musical sound synthesizing means and image synthesizing means, and the information file being used for displaying information by driving said musical sound synthesizing means and said image synthesizing means;

information file list storing means for storing a list of necessary information files for each of the communication karaoke apparatuses or for each area where at least one of the communication karaoke apparatuses is located;

extracting means for extracting an information file which is to be downloaded to a selected one of said communication karaoke apparatuses based on the list of necessary information files that corresponds to said selected communication karaoke apparatus, when a music-piece file is to be downloaded to the selected communication karaoke apparatus; and downloading means for downloading said extracted information file and said music-piece file to said selected communication karaoke apparatus.

2. The karaoke system as defined in claim 1, wherein the information file is used to drive the musical sound synthesizing means and the image synthesizing means between karaoke performances.

3. A method of downloading files to communication karaoke apparatuses, said method comprising the steps of:

storing music-piece files and information files, the music-piece files being used during a karaoke performance to drive musical sound synthesizing means and image synthesizing means, and the information files being used to display information during an intermission in the karaoke performance to drive said musical sound synthesizing means and said image synthesizing means;

storing lists of necessary information files for areas where the communication karaoke apparatuses are located;

establishing communication between a host apparatus and a selected communication karaoke apparatus;

extracting an information file which is to be downloaded based on the list of necessary information files corresponding to said selected communication karaoke apparatus; and downloading the extracted information file and at least one music-piece file to the selected communication karaoke apparatus.

4. The method as defined in claim 3, wherein the extracting step includes the sub-steps of:

uploading a list of presently stored information files from the selected communication karaoke apparatus; and extracting the information file which is to be downloaded based on a comparison between the uploaded list of stored information files and the list of necessary information files corresponding to the selected communication karaoke apparatus.

5. The method as defined in claim 4, further comprising the step of downloading the list of necessary information files that corresponds to the selected communication karaoke apparatus to the selected communication karaoke apparatus.

6. The method as defined in claim 3, further comprising the step of downloading the list of necessary information files that corresponds to the selected communication karaoke apparatus to the selected communication karaoke apparatus.

7. A host karaoke apparatus for downloading files to a plurality of communication karaoke apparatuses, said host karaoke apparatus comprising:

information file list storing means for storing lists of information files, each list of information files indicating which information files are required by one of the communication karaoke apparatuses or for one area where communication karaoke apparatuses are located;

extracting means for extracting at least one information file which is to be downloaded to a selected one of the communication karaoke apparatuses based on the list of necessary information files that corresponds to the selected communication karaoke apparatus, when at least one music-piece file is to be downloaded to the selected communication karaoke apparatus; and downloading means for downloading the at least one extracted information file and the at least one music-piece file to the selected communication karaoke apparatus, wherein each music-piece file is used during a karaoke performance to drive musical sound synthesizing means and image synthesizing means for the karaoke performance, and each information file is used during an intermission in karaoke performances to drive the musical sound synthesizing means and the image synthesizing means to display information.

8. The host karaoke apparatus as defined in claim 7, wherein each information file is used to display a commercial during intermission.

* * * * *